(No Model.) 2 Sheets—Sheet 1.
J. F. STEWARD.
HARVESTING MACHINE.
No. 390,531. Patented Oct. 2, 1888.
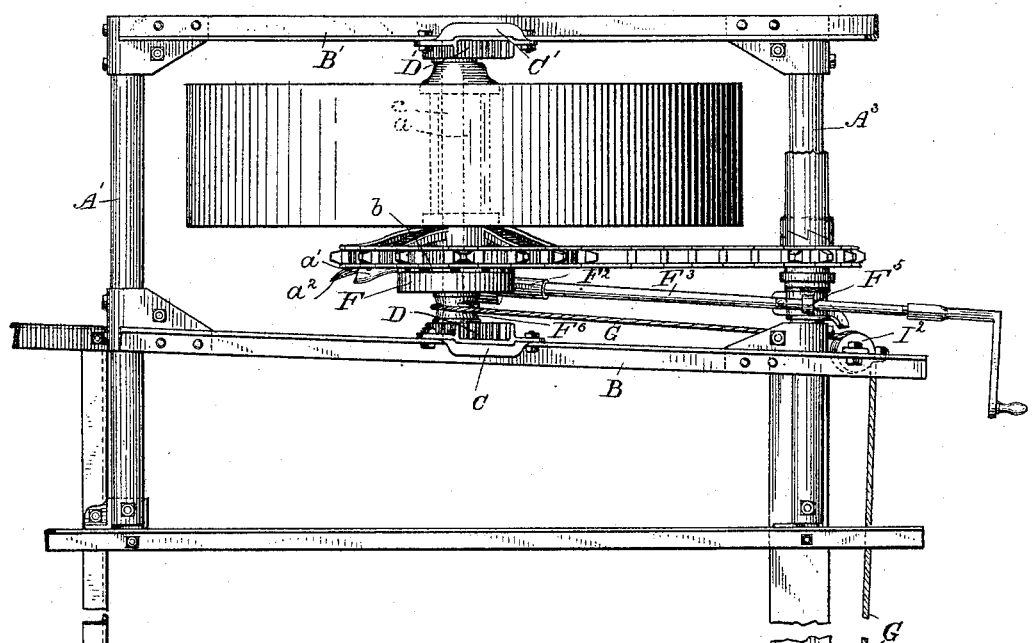
*Fig. 1.*
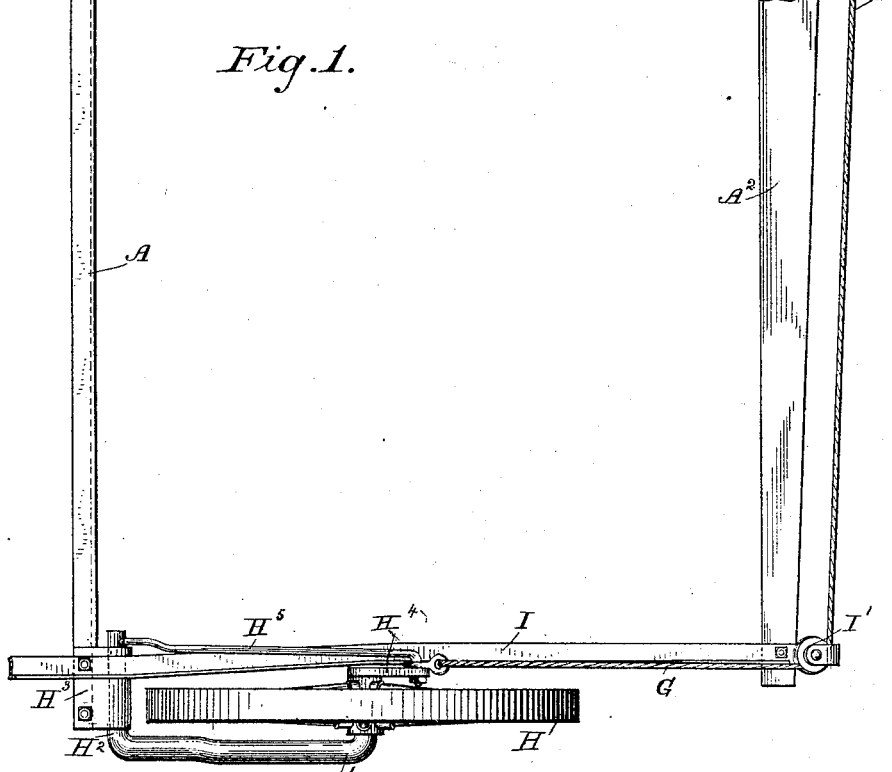
Witnesses.
Arthur Johnson.
W. L. Miles
Inventor.
John F. Steward (No Model.) 2 Sheets—Sheet 2.

J. F. STEWARD.
HARVESTING MACHINE.

No. 390,531. Patented Oct. 2, 1888.

Witnesses
Arthur Johnson
W. L. Miller

Inventor:
John F. Steward

UNITED STATES PATENT OFFICE.

JOHN F. STEWARD, OF CHICAGO, ILLINOIS.

HARVESTING-MACHINE.

SPECIFICATION forming part of Letters Patent No. 390,531, dated October 2, 1888.

Application filed March 8, 1888. Serial No. 266,519. (No model.)

*To all whom it may concern:*

Be it known that I, JOHN F. STEWARD, of the city of Chicago, in the county of Cook and State of Illinois, have invented certain new and useful Improvements in Harvesting-Machines, of which the following is a full description, reference being had to the accompanying drawings, in which—

Figure 2:
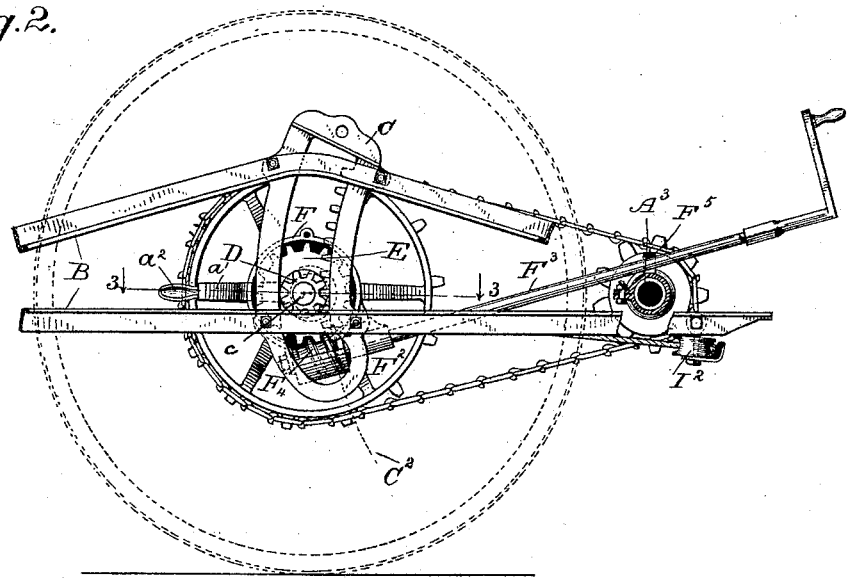
Figure 4:
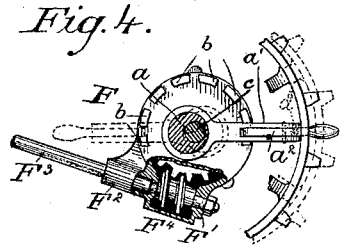
Figure 3:
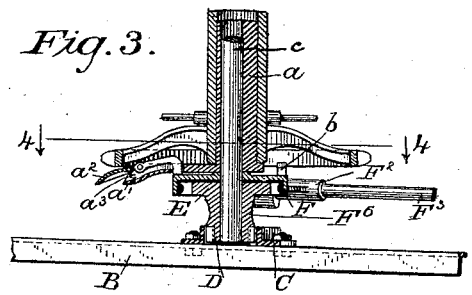
Figure 5:
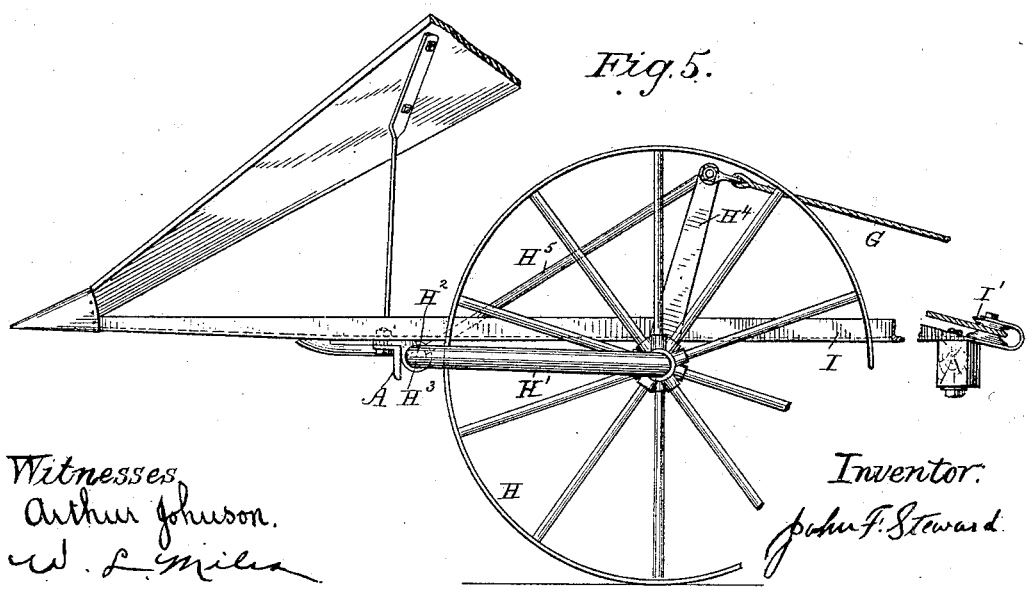

Figure 1 is a plan view of all the parts necessary to show my invention; Fig. 2, a grain-side elevation of the raising and lowering devices which act upon the main-wheel frame; Fig. 3, a sectional view of the main-wheel hub and the raising and lowering devices for the stubble end of the harvester; Fig. 4, a view of the chain-tightening devices and the screw for producing vertical adjustment of the machine; Fig. 5, a grain-side view of the grain divider and its supporting-wheel.

The method herein provided for transmitting motion from the main wheel to the gearing of the harvester is by a chain thrown over a sprocket-wheel secured to the main supporting-wheel and adapted to drive a sprocket-wheel rotating upon the rear frame sill, which is preferably made of gas-pipe, as shown, described, and claimed in patent to H. N. Kennedy, B. A. Kennedy, and John F. Steward, No. 351,268, dated October 19, 1886.

The object of the invention is to provide means for tightening the chain as it becomes slack from wear or extension and for placing the main axle temporarily in such a position as to reduce its distance from the driving sprocket-wheel that the chain may be thrown on or off at will—as, for instance, after replacement of broken links and for other purposes.

In the drawings, A is the finger-bar; A', the front sill; A², the rear platform sill; A³, the rear sill of the gearing-frame. The latter is preferably made cylindrical for the purpose of forming an axis for rotation of the sprocket-wheel, over which the chain is thrown. This is not essential, because the same can be made a rotating shaft and the sill be placed either in front or rear of it; but I prefer it as shown.

B is the grain-side truss, and B' the stubble-side truss, of the main-wheel frame.

C is the grain-side and C' the stubble-side segments, commonly known as "segment-racks," in which the main-wheel axle $c$ is secured. They are provided with teeth in the usual manner; but they are extended downward somewhat farther than is necessary for the highest adjustment of the wheel. The teeth are from preference applied to the rearmost of the parallel parts of the segment, and that portion which is extended lower than is necessary for the vertical adjustment of the wheel is thrown sharply backward, as shown in Fig. 2.

$C^2$ in Fig. 2 is a dotted line, which I have placed upon the drawings to show the continuation of the curve of the rack upon which the teeth are placed. It will be observed that the rearmost wall of the segments drops back some distance from this line.

The axle $c$ is provided with pinions D and D'. These pinions are firmly secured to the axle. Also secured to the axle is the worm-wheel E, housed in the case F. This housing forms bearings F' and F² for the shaft F³, upon which is mounted within the housing the screw F⁴. The screw-shaft extends backward over the main sill and passes loosely through the bearing F⁵, which is secured to the back sill. The shaft is fitted with a crank, by which rotation may be produced. The housing F is, as shown in Fig. 3, supported upon the axle $c$; but the axle is free to revolve therein. The worm-wheel is also provided with a cylindrical hub, F⁶, which is adapted to take a rope or chain, G, capstan like. It will thus be seen that by rotation of the screw-shaft the worm-wheel secured to the axle and the pinions also secured thereto will be rotated, and by such rotation the pinions will be caused to rise and fall in the segment-racks and the harvester-frame thus depressed or elevated. It will further be seen that if the crank is turned far enough in the direction to raise the machine the segments will be carried so high that the pinions will roll into the lower portion, which is suddenly deflected back, as is seen in Fig. 2, and the wheel, sprocket-wheel, and all of the parts mounted upon the axle will be carried backward. This backward deflection of the segments need but be sufficient to throw the wheel and the sprocket-wheel to the rear enough to slack the chain, so that it may be thrown on or off. In practice I find that with a total deflection of less than an inch and a half the slacking of a chain having links of two-inch pitch is abundantly sufficient. I do not wish to limit myself to the location of this deflected portion of the segments at the bottom end thereof, for they may be at the top, in which case the segment would be like those of Fig. 2 turned upside down. I prefer it, however, at the bottom, as is shown. The upper end of the segment is made open above the racks, so that the pinions may be dropped in in putting the machine together. I secure the rear end of the worm-shaft loosely in an eye, so that it may slide back and forth when the pinions roll in or out of the deflected portion just described.

H is the grain-wheel, mounted upon an arm, H', which is pivoted at H² in a plate or socket, H³, adapted to surround it and be bolted or riveted firmly to the front sill, A. A portion of the arm H' is turned stubbleward and passes through the hub of the wheel, thus forming a journal for the same. Projecting upward from the stubble end of this journal is the arm H⁴.

H⁵ is a brace extending from the top of the arm H⁴ to the stubble end of the axis H² and secured at both points.

It will be perceived that the arm H⁴ and brace H⁵ serve as a connection between the journals at the two ends of the wheel-carrying arm, and that when the cable G is strained the brace H⁵ acts with a lifting effect on the forward end of the wheel-carrying arm and on the frame. Owing to the application of the power at the inner or stubble ends of the journals, the wheel-carrying arm is relieved in part from the torsional strain to which it would otherwise be subjected, so that the grain-wheel is prevented from tipping sidewise.

I is the divider-sill, its rear end bent backward and forward, as shown in Fig. 5, with a sheave, I', lying between the two portions.

I² is a sheave secured to the truss B at its rear grain corner. The wire, rope, or chain G passes backward and around the sheave I², thence around the sheave I', and extends forward, where it is connected to the top of the arm H⁴. It will be observed that as the wheel-axle is rotated in raising the machine the rope G is wound up, and the stubble end is caused to rise simultaneously.

$a$ is an eccentric surrounding the main-wheel axle $c$, having about an inch of throw and adapted to rock on the axle. In order that it may be rocked there is secured to it, preferably cast as one piece, the arm $a'$, having a latch-lever, $a^2$, the latter held in position by the spring $a^3$. The housing F of the worm-wheel is provided with catches $b$ upon its side, and the latch-lever is adapted to engage therein. The eye of the main supporting wheel-hub is enlarged to fit loosely around and rotate upon this eccentric. The axle is supported, as stated, by the pinions which engage the raising and lowering segments D and D'. The housing F cannot rotate upon the axle, because it is held by the screw-shaft. If the arm or lever $a'$ be unlatched and rocked upon the axle which supports it, the main wheel will be thrown fore and aft. For instance, with the lever in the position shown in full lines in Fig. 4 the sprocket-wheel will occupy a position therein shown in full lines in section, while if the lever were thrown over to the position in the dotted lines the sprocket-wheel and grain-wheel, as well as the main wheel, would be thrown to the position shown in dotted lines. It will thus be seen that I have means whereby the main driving sprocket-wheel may be adjusted fore and aft, so as to take up any slack in the driving-chain. If it is preferred, those availing themselves of this invention may make this eccentric so as to have very much more throw—sufficient to slacken the chain so far that it may be thrown off. In that case the deflected portion of the segment may be dispensed with; but I prefer using the two, because, in order to throw the sprocket-wheel far enough to the rear to permit the adjustment of the chain, and still far enough forward to take up all slack of the chain due to wear and extension, the eccentric would be so large as to create undue friction of the main wheel upon it as an axis.

I do not limit myself to the precise mechanism of locking the arm of the eccentric sleeve, as any of the well-known segment mechanisms may be used.

While I have represented herein a sprocket-chain and pulleys for communicating motion from the main wheel to the gearing on the frame, and while I prefer to employ this arrangement, it is manifest that my wheel-adjusting devices may be used in connection with any of the ordinary systems of gearing for transmitting motion from the main wheel, various arrangements for this purpose, which are foreign to my invention, being known to every person skilled in the art.

What I claim as my invention, and desire to secure by Letters Patent, is—

1. In a harvester, the combination of a ground-wheel provided with a wheel to drive the harvester-gearing, a vertically-adjustable frame, gearing mounted thereon and driven from the ground-wheel, the ground-wheel axle, and the axle-guides mounted on the frame and provided each with a sudden deflection or offset to change the distance between the axle and the gearing on the frame.

2. In a harvester, the combination of the ground-wheel and the sprocket-wheel thereon, the vertically-adjustable frame, the sprocket-wheel thereon, the chain connecting said sprocket-wheels, the main-wheel axle, and the axle-guides each suddenly deflected or offset at one end toward the wheel on the frame, whereby the distance between the sprocket-wheels may be reduced to release the chain.

3. The combination of the main or supporting wheel supported upon an axle adapted to be rotated therein, the said axle provided with pinions, segmental guides provided with teeth in which the axle-pinions engage, the segmental guides secured to the main supporting-frame and having deflections at one end, and means, substantially such as described, for rotating the said axle, whereby the frame may be moved until the segments occupy such a position relative to the said pinions that they may be caused to roll into the deflections and thereby cause a movement of said axle and said wheel in a direction eccentric to the segment and fore and aft of the frame, substantially as described.

4. The harvester-frame, the plates C C', having the gear-teeth and the segmental slots offset or deflected at one end, as described and shown, the ground-wheel and its sprocket-wheel, its axle mounted in the slotted plates and provided with pinions engaging their teeth, a wheel on the main frame, a chain connecting the same with the first-named sprocket-wheel, and mechanism, substantially as shown, for rotating the axle to cause it to travel into and out of the deflections in the plates, whereby the frame may be raised and lowered and the driving-chain thrown into and out of action.

5. In combination with the platform-frame and the tubular plate or socket $H^3$, rigidly secured thereto, the grain-wheel, the wheel-carrying arm H', having at one end the journal $H^2$, extended stubbleward through the socket, and at the other end a journal extended stubbleward through the wheel, the arm $H^4$ on the stubble end of the wheel-carrying journal, the brace or rod $H^5$, extending from said arm to the stubble end of the journal $H^2$, and the operating-cable G, applied substantially as shown.

6. In a harvester having a main frame, a main ground-wheel, a revoluble axle, and intermediate connections for adjusting the height of the frame, as usual, an eccentric-sleeve, $a$, mounted upon and revoluble around the axle and serving as the main-wheel bearing, whereby the wheel may be adjusted horizontally in relation to the frame and the frame adjusted vertically in relation to the wheel, each independent of the other.

7. The main frame and its segment-racks, in combination with the axle, its pinions engaging the racks, and suitable mechanism for turning and locking the axle, as usual, the eccentric-sleeve revoluble upon the axle, the lock to prevent the rotation of the sleeve, and the ground-wheel loosely mounted on the sleeve.

8. The harvester main frame, its segment-racks provided with deflections in a fore-and-aft direction, the axle, its pinions, and means for turning the pinions, as usual, in combination with the eccentric-sleeve revoluble upon the axle and the main wheel mounted loosely upon the sleeve, whereby the frame may be raised and lowered and the wheel moved horizontally therein by means of said adjustments and the horizontal adjustment of the wheel within the frame permitted independently of the vertical frame adjustment.

9. The combination of the axle provided with pinions, the segments having deflections in a fore-and-aft direction, the eccentric-sleeve mounted upon said axle, the main-wheel hub journaled upon said eccentric-sleeve supported on the axle, one of said axle-pinions provided with a worm-wheel, E, the worm-shaft $F^3$, and suitable means for rotating said worm-shaft, the main-wheel hub provided with a sprocket-wheel, a sprocket-wheel mounted upon the main frame, a chain connecting said sprocket-wheels, the worm journaled into the bearings secured to said axle, and locking mechanism thereon, whereby the said eccentric-sleeve may be locked to the part forming the journaled bearings for the worm, substantially as described.

10. The frame, its segmental racks, and the axle, with its pinions and worm-wheel, in combination with the housing F, the worm and rod sustained thereby, the eccentric-sleeve revoluble on the axle, its arm adapted to engage the housing, and the main wheel freely mounted on the sleeve.

JOHN F. STEWARD.

Witnesses:
A. H. WARE,
W. L. MILES.